United States Patent Office
3,463,801
Patented Aug. 26, 1969

3,463,801
RANDOM POLY-m-CARBORANYLENESILOXANE COPOLYMERS
Stelvio Papetti and Hansjuergen A. Schroeder, Hamden, Conn., assignors to Olin Mathieson Chemical Corporation, a corporation of Virginia
No Drawing. Filed Dec. 29, 1967, Ser. No. 694,403
Int. Cl. C07f 7/08
U.S. Cl. 260—448.2     6 Claims

ABSTRACT OF THE DISCLOSURE

Random poly-m-carboranylenesiloxane copolymers are provided by reacting a 1,7-bis[alkoxydialkyl(or diaryl)-silyl]-m-carborane with a dihalodialkyl(or diaryl)silane and a 1,7-bis[halodialkyl(or diaryl)silyl]-m-carborane in the presence of a reaction catalyst. A dihalo vinyl-containing silane compound can also be included as a co-reactant. These random poly-m-carboranylenesiloxane copolymers are mixed with a boron-oxygen-containing compound to provide adhesive forming compositions. They may also be mixed with inert fillers and cured to provide compositions useful as gaskets, o-rings, etc.

This invention relates to random poly-m-carboranylene-siloxane copolymers and, more particularly, to copolymers containing randomly dispersed units having the formulas I 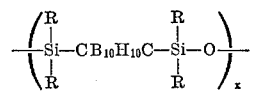

II 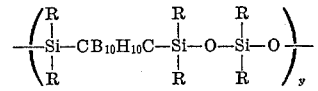

III 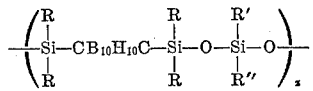

wherein each R is an independently selected alkyl or aryl; R' is hydrogen, alkyl, aryl, vinyl or a vinyl-containing moiety; R" is vinyl or a vinyl-containing moiety; $x$ and $y$ are independently selected integers greater than 1 and $z$ is 0 or an integer greater than 0 with the proviso that the mole ratio of $x/y+z$ is between about 0.1 and about 10.

Various linear polymers containing poly-m-carboranylene-siloxane units have been previously prepared and described in the literature. For example, S. Papetti et al. in J. Polymer Science, 4, (A–1) 1623–1626 (1966) report the synthesis of a crystalline polymer consisting of units having the formula IV 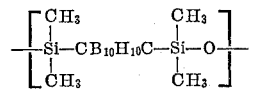

The same authors also disclose an elastomeric polymer consisting of repeating units having the formula V 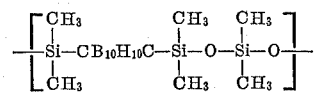

and polymers having the above formulas wherein some of the pendant methyl groups are replaced with vinyl or 1-vinylcarboran-2-yl moieties. While these polymers have a variety of applications in areas where thermoresistance is required, they are unattractive for use in the preparation of high shear strength adhesives.

Now it has been found that random poly-m-carboranyl-ene-siloxane copolymers having surprising adhesive forming properties are provided by reacting a 1,7-bis[alkoxy-dialkyl(or diaryl)silyl]-m-carborane with a dihalodialkyl (or diaryl)-silane and a 1,7-bis[halodialkyl(or diaryl) silyl]-m-carborane in the presence of a reaction catalyst.

The 1,7-bis[halodialkyl(or diaryl)silyl]-m-carboranes useful as starting materials in the preparation of the polymers of this invention have the formula VI 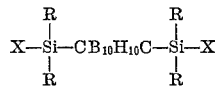

wherein R is as previously described and X is chlorine, bromine or iodine. These compounds are prepared from di(alkali metal)-m-carborane and dihalodialkyl(or diaryl)-silane as described by S. Papetti et al in Inorg. Chem 3, 1448 (1964).

Useful 1,7-bis[halodialkyl(or diaryl)silyl)]-m-carboranes include 1,7-bis(chlorodimethylsilyl)-m-carborane, 1,7-bis (chlorodiethylsilyl)-m-carborane, 1,7-bis(chloromethyl-ethylsilyl-m-carborane, 1,7-bis(chlorodi-n-propylsilyl)-m-carborane, 1,7-bis(chlorodi-n-butylsilyl)-m-carborane, 1,7-bis(chlorodiisoamylsilyl)-m-carborane, 1,7-bis(chloro-di-n-hexylsilyl)-m-carborane, 1,7-bis(chlorodinonylsilyl)-m-carborane, 1,7-bis(chlorodioctylsilyl)-m-carborane, 1,7-bis(chlorodidodecylsilyl)-m-carborane, 1,7-bis(chlorodi-n-octylsilyl)-m-carborane, 1,7-bis(chlorodiphenylsilyl)-m-carborane, 1,7-bis(chloroditolylsilyl)-m-carborane, 1,7-bis (chlorodixylylsilyl)-m-carborane, etc. and the corresponding bromine and iodine derivatives.

1,7-bis[alkoxydialkyl(or diaryl)silyl]-m-carboranes employed in the reaction with the previously described 1,7-bis [halodialkyl(or diaryl)silyl]-m-carboranes have the formula VII 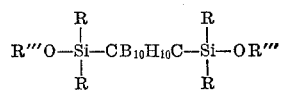

wherein R is as previously described and R''' is alkyl having 1 to 6 carbon atoms and are readily prepared by reacting one of the previously described 1,7-bis[halodialkyl(or diaryl)silyl]-m-carboranes VI with an appropriate alcohol according to the process described by S. Papetti et al. in Inorg. Chem., 3, 1448 (1964).

Included in the group of 1,7 - bis[alkoxydialkyl(or diaryl)-silyl]-m-carboranes useful as starting materials are 1,7 - bis(methoxydimethylsilyl) - m - carborane, 1,7-bis (methoxydiethylsilyl) - m - carborane, 1,7 - bis(methoxy-methylethylsilyl) - m - carborane, 1,7 - bis(ethoxydimeth-ylsilyl) - m - carborane, 1,7 - bis(ethoxydi - n - propyl-silyl) - m - carborane, 1,7-bis(ethoxyethylisopropylsilyl)-m-carborane, 1,7-bis(n-propoxydiisoamylsilyl) - m - carborane, 1,7 - bis(isopropoxydi - n - propylsilyl) - m - carborane, 1,7 - bis(n - butoxydimethylsilyl) - m - carborane, 1,7 - bis(isobutoxydi - n - propylsilyl) - m - carborane, 1,7-bis(ethoxydi - n - propylsilyl) - m - carborane, 1,7-bis (methoxydi - n - butylsilyl) - m - carborane, 1,7 - bis (methoxydi - n - hexylsilyl) - m - carborane, 1,7 - bis methoxydiphenylsilyl) - m - carborane, 1,7-bis(methoxy ditolylsilyl) - m - carborane, 1,7-bis(methoxydixylylsilyl)-m-carborane, etc.

Dihalodialkyl(or diaryl) silanes suitable for use in the preparation of the copolymers of this invention have the following formula wherein R and X are as previously described.

VIII 

Illustrative of these compounds are dimethyldichloro-silane, methyl - n - propyldichlorosilane, diethyldichloro-silane, ethylmethyldichlorosilane, diisopropyldichlorosilane, diamyldichlorosilane, dihexyldichlorosilane, diphenyldichlorosilane, methyltolyldichlorosilane, dixylyldichlorosilane, ethylisobutyldichlorosilane, n-propyltolyldichlorosilane, etc., and the corresponding bromine and iodine derivatives.

Random copolymers comprising units having the Formulas I and II are provided by employing a 1,7-bis[halodialkyl(or diaryl)silyl] - m - carborane VI, a 1,7 - bis[alkoxydialkyl (or diaryl)silyl] - m - carborone VII and a dihalodialkyl(or diaryl) silane VIII as reactants. Mixtures of two or more of each of the previously described reactants can also be utilized to provide polymers having a variety of substituents, e.g., methyl, ethyl, propyl, etc.

While any of the previously described 1,7-bis[halodialkyl(or diaryl)silyl] - m - carboranes VI, 1,7-bis[alkoxydialkyl(or diaryl)-silyl] - m - carboranes VII and dihalodialkyl(or diaryl) silanes VIII can be employed in the preparation of the poly-m-carboranylenesiloxanes of this invention, preferred embodiments employ those beginning reactants wherein R is lower alkyl, i.e., 1–4 carbon atoms.

Where random copolymers comprising units I, II and III are desired, a compound having the formula

IX

wherein R', R" and X are as previously described is included as a reactant together with compounds VI, VII and VIII. Illustrative compounds having the Formula IX are dichloro(1-vinyl-o-carboran-2-yl)methylsilane, methylvinylidichlorosilane, divinyldichlorosilane, methylallyldichlorosilane, ethylallyldichlorosilane, n - propylallyldichlorosilane, ethylisopropenyldichlorosilane, diallyldichlorosilane. Particularly preferred are those compounds IX wherein R' is lower alkyl, i.e., alkyl having 1 to 4 carbon atoms or phenyl and R" is vinyl or 1 vinyl-o-carboran-2-yl. The inclusion of an unsaturated substituent in the copolymer by utilizing one of the previously described compounds IX as a coreactant accelerates curing of the copolymer. While large amounts of the previously described vinyl-containing silane compound IX can be employed in the preparation of the copolymers of this invention, it is preferred to utilize approximately 0.2 to 10 mole percent based on the dihalodialkyl(or diaryl)silane VIII.

Ferric chloride has been found to be a particularly effective reaction catalyst in the preparation of the copolymers of this invention. Anhydrous ferric chloride or any of the various hydrated ferric chlorides or mixtures thereof can be suitably employed. Generally the catalyst is added in an amount from about 0.01 to about 5 mole percent and preferably from about 0.5 to about 3.0 percent based on the total number of moles of the reactants employed. However, greater or lesser amounts can be effectively employed.

The preparation of the random poly-m-carboranylenesiloxane copolymers is carried out at a temperature between about 100 to about 250° C. and preferably from about 110 to about 190° C. Preferably, at the beginning of the reaction a temperature from about 130 to 140° C. is maintained. After about 50 to about 70 percent of the theoretical amount of gaseous alkyl by-product has evolved, the reaction mixture commences to solidify and the reaction appears to cease. Therefore, it has been found desirable in the final stages to raise the temperature to about 175 to about 190° C. at which temperature the gas evolution resumes. If desired, additional catalyst can be added at this point. The product is then heated at this temperature range for about one hour. Elimination of the catalyst from the polymeric product can be accomplished by washing with acetone or a mixture of acetone and concentrated hydrochloric acid.

The random poly-m-carboranylenesiloxane coploymers of this invention have molecular weights up to about 200,000 and even greater; however, polymeric products having molecular weights of at least about 2,000 are generally preferred.

While any copolymer containing randomly dispersed units having the Formulas I, II and III can be provided according to the practice of this invention, random copolymers wherein the mole ratio of $x/y+z$ is between about 0.5 and about 8 are preferred.

The random poly-m-carboranylenesiloxane copolymers of this invention have a variety of useful applications. Thus, they are admixed with inert fillers such as silica and heated to provide cured compositions useful as gaskets, o-rings and the like in applications where high-temperature resistant properties are desired.

Furthermore, these copolymers are particularly valuable in the preparation of adhesives having high shear strengths and excellent thermal properties. When compounded with a boron-oxygen-containing compound, an adhesive-forming composition is provided which can be applied to a surface and cured to effect strong bonding between a variety of surfaces.

The effectiveness of the copolymers of this invention is particularly surprising since it has been found that adhesives formulated from linear poly-m-carboranylenesiloxanes IV and V have significantly lower shear strengths than those made from the random copolymers described herein. Thus, the use of a linear poly-m-carboranylenesiloxane provides adhesives having a shear strength of about 700–900 p.s.i., whereas adhesives prepared from the random poly-m-carboranylenesiloxane copolymers of this invention have shear strengths above 1,000 and, in most instances above 1,500 p.s.i.

The formulation of adhesives based on a boron-oxygen-containing compound and the random poly-m-carboranylenesiloxane copolymers of this invention is more fully described in copending patent application 694,402, filed concurrently herewith, now U.S. Patent 3,445,427 and said application is hereby incorporated in its entirety herein.

Briefly, a boron-oxygen-containing compound such as boric oxide or metaboric acid is admixed with the random poly-m-carboranylenesiloxane in a proportion between about 2 and about 80 parts and preferably between about 40 and about 50 parts of boron-oxygen-containing compound per 100 parts of polymer. An inert filler, e.g. silica, titanium dioxide, etc. may be admixed with the above-decsribed formulation if desired. Other optional ingredients include antioxidants such as ferric oxide and colorants such as carbon black.

The adhesive-forming composition based on the random poly-m-carboranylenesiloxane copolymers of this invention is then applied to a surface, contacted with another surface and the composite heated at temperatures of about 600° to about 900° F. to effect curing thereof. Pressure may be applied during the curing if desired.

A variety of surfaces can be bonded by adhesives containing the random poly-m-carboranylenesiloxane copolymers of this invention. For example, glass; metals such as stainless steel, titanium, copper, brass, and various alloys; plastics; wood; etc. are all susceptible of being bonded together by these adhesives. Since the resultant bond possesses high temperature resistant properties in addition to the high shear strength described above, these adhesives are particularly valuable in bonding together parts of aircraft.

The following examples will serve to illustrate the preparation of various random poly-m-carboranylenesiloxane copolymers as described herein and adhesive formulations containing said random poly-m-carboranylenesiloxanes.

In the examples, shear strength was determined following the general procedure of ASTM D 1002–64. Two 1 x 5 inch titanium alloy strips, comprising 90 percent by weight titanium, 4 percent vanadium and 6 percent aluminum, were degreased by immersion in toluene followed by an acetone rinse. The strips were then cleaned by etching via immersion for two minutes in a solution of 100 ml. 85 percent phosphoric acid/2 ml. hydrofluoric acid. After washing in distilled water, the strips were dried with acetone and then heated to approximately 100° F. in an oven. Unless otherwise specified, a poly-m-carboranylenesiloxane primer comprising recurring units having the following formula

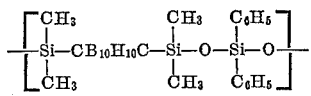

was preheated to approximately 150° F. and applied to one end of each strip to form a primed surface having an area of one square inch; the primer was applied to a dry thickness of approximately 3 mils. After allowing the primed strips to cool to room temperature, a one square inch piece of the compounded adhesive was placed between the primed surface and the area to be bonded compressed by means of a C-clamp to approximately 50 p.s.i. The joint was cured at 550° F. for one hour followed by heating at 600° F. for an additional hour. After allowing the assembly to cool to room temperature, the C-clamp was removed and shear strength of the joint determined by placing of the strips in tension. The reported data represents the maximum force in p.s.i. which was attained during stretching of the joint.

EXAMPLE 1

A. Preparation of polymer 1,7-bis(methoxydimethylsilyl)-m-carborane (176.4 g.), 1,7-bis(chlorodimethylsilyl)-m-carborane (44.42 g.), dimethyldichlorosilane (53.64 g.), anhydrous ferric chloride (0.45 g.) and hydrated ferric chloride (0.45 g.) were mixed in a 300 ml. single-necked flask which was equipped with a stirrer and a nitrogen inlet line for flushing the apparatus. The reaction flask was also connected to a vacuum line having a bubble-off and an outlet for sampling volatile products. A wet-test meter was connected to the bubble-off to measure methyl chloride evolution. The flask was placed in an oil bath and heated at a temperature of about 130°–135° C. After one hour, the wet-test meter indicated that the reaction had ceased. A second portion of catalyst consisting of 0.45 g. anhydrous ferric chloride and 0.45 g. hydrated ferric chloride was added to the reaction mixture. Heating was continued and gas evolution resumed at 180–185° C. After approximately 30 minutes, the reaction mixture became too thick to stir. Heating was continued at 180–185° C. for an additional hour. After cooling to room temperature, the resulting rubbery material was washed twice in a blender with an acetone-concentrated hydrochloric acid mixture and once with acetone to provide 193 g. of product. Infrared analysis and the following analytical data revealed that a random copolymer consisting essentially of units having the following formula wherein the mole ratio of $x$ to $y$ is 0.65 had been obtained.

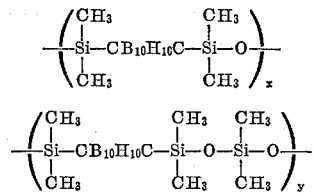

*Analysis.*—Calcd. for $C_{36}H_{128}B_{50}Si_{13}O_8$: C, 27.10; H, 8.09; B, 33.90; Si, 22.89. Found: C, 26.88; H, 8.03; B, 32.31; Si, 22.97.

B. Preparation of adhesive composition

One hundred parts by weight of the polymer described in part A were mixed with 50 parts of metaboric acid until a good dispersion was obtained. The resulting composition was passed through a warm mill (approximately 100–110° F.) until banded. Milling was continued until the composition appeared homogeneous. The rollers were adjusted and the compounded adhesive composition cut off as a 15 ml. thick sheet. Shear strength was determined and is set forth in the table below.

EXAMPLE 2

A. Preparation of polymer 1,7 - bis(methoxydimethylsilyl - m - carborane (72.41 g.), 1,7 - bis(chlorodimethylsilyl - m - carborane (36.70 g.) and dimethyldichlorosilane (14.78 g.) were reacted in the presence of anhydrous ferric chloride (0.37 g.) and hydrated ferric chloride (0.37 g.) in the same manner as described in Example 1. Infrared analysis and the following analytical data revealed that a random copolymer having units of the formula set forth in Example 1 wherein the mole ratio of $x$ to $y$ is 1.9 has been obtained.

*Analysis.*—Calcd. for $C_{20}H_{72}B_{30}Si_7O_4$: C, 26.75; H, 8.08; B, 36.14; Si, 21.90. Found: C, 26.00; H, 7.98; B, 34.93; Si, 22.41.

B. Preparation of adhesive composition

Following the procedure of Example 1, Part B, an adhesive composition was made employing 100 parts by weight of the polymeric described in part 1 and 50 parts of metaboric acid; shear strength is set forth in the table below.

EXAMPLE 3

A. Preparation of polymer

Following the general procedure of Example 1, 98.77 g. 1,7 - bis(methoxydimethylsilyl - m - carborane, 75.6187 g. 1,7 - bis(chlorodimethylsilyl) - m - carborane and 10.1473 g. dimethyldichlorosilane were reacted at room temperature in the presence of 0.5 g. anhydrous ferric chloride and 0.5 g. of hydrated ferric chloride to provide 141 g. of a hard, brittle product. Infrared analysis and the following analytical data revealed that a random copolymer having units of the formula set forth in Example 1 wherein the mole ratio of $x$ to $y$ is about 5.8 had been obtained.

*Analysis.*—Calcd. for $C_{26}H_{94}B_{40}Si_9O_5$: C, 26.47; H, 8.08; B, 37.94; Si, 21.10. Found: C, 25.78; H, 8.05; B, 36.20; Si, 21.00.

B. Preparation of adhesive composition

Following the procedure of the previous examples, an adhesive composition was made employing 100 parts by weight of the polymer described in part 1 and 50 parts of metaboric acid; shear strength is set forth in the table below.

EXAMPLE 4

A. Preparation of polymer 1,7 - bis(chlorodimethylsilyl) - m - carborane (73.338 g.), 1,7 - bis(methoxydimethylsilyl) - m - carborane (95.138 g.), dichloro(1 - vinyl - o - carboran - 2 - yl) methylsilane (0.252 g.) and dimethyldichlorosilane (9.54 g.) were reacted in the presence of a mixture of 0.24 g. of anhydrous ferric chloride and 0.24 g. of hydrated ferric chloride at a temperature of about 134–140° C. After approximately 50 minutes, gas evolution ceased and an additional amount of hydrated ferric chloride (0.48 g.) was added. The reaction mixture was then heated to 180–183° C., at which point gas evolution resumed. After 15 minutes the reaction mixture became too thick to stir. It was then heated for an additional hour at 182–183° C. The resulting product was cooled to room temperature, ground to a fine powder and washed with acetone to provide 137 g. of white product. Infrared analysis and the following analytical data revealed that a random copolymer composed of units having the following formula wherein the ratio of $x$ to $y+z$ is 5.9 had been obtained.

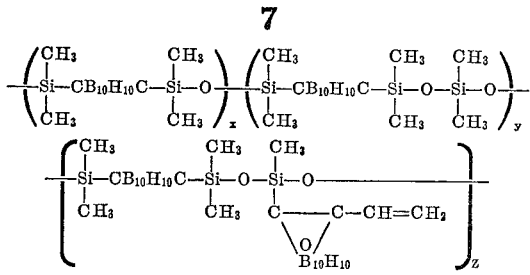

*Analysis.*—Calcd. for $C_{44.00}H_{159.98}B_{70.02}Si_{14.99}O_{8.00}$: C, 26.47; H, 8.08; B, 37.95; Si, 20.09. Found: C, 22.25; H, 8.26; B, 37.46; Si, 19.31.

B. Preparation of adhesive composition

Following the procedure of the previous examples, an adhesive composition was made employing 100 parts by weight of the polymer described in part 1 and 50 parts of metaboric acid; shear strength is set forth in the table below.

EXAMPLE 5

A. Preparation of polymer

Following the procedure of the previous examples, 1,7 - bis(chlorodimethylsilyl) - m - carborane (52.863 g.), 1,7 - bis(methoxydimethylsilyl) - m - carborane (102.877 g.), dichloro - (1 - vinyl - o - carboran - 2 - yl)-methylsilane (0.273) and dimethyldichlorosilane (20.7 g.) were reacted in the presence of anhydrous ferric chloride (0.26 g.) and hydrated ferric chloride (0.26) to provide 141 g. of polymer. Infrared analysis and the following analytical data revealed that the product had the formula set forth in Example 4 with a mole ratio of $x/y+z$ of 2.0.

*Analysis.*—Calcd. for $C_{20.00}H_{71.99}B_{30.02}Si_{6.99}O_{4.00}$: C, 26.75; H, 8.08; B, 36.17; Si, 21.88. Found: C, 24.74; H, 9.09; B, 36.07; Si, 19.26.

B. Preparation of adhesive composition

Following the procedure of the previous examples, adhesive compositions were made employing the polymer described in part A; the ingredients and proportions employed are set forth below.

| Example | Boron-oxygen-containing compound | Parts/100 parts polymer |
|---|---|---|
| 5a | Boric oxide | 25 |
| 5b | Metaboric acid | 50 |
| 5c | Boric oxide | 80 |

The shear strengths for these adhesive compositions are listed in the table; no primer was used in testing the adhesive compositions of Examples 5a and 5c.

EXAMPLE 6

A. Preparation of polymer 1,7 - bis(chlorodimethylsilyl) - m - carborane (69.70 g.), 1,7 - bis(methoxydimethylsilyl) - m - carborane (271.30 g.), dimethyldichlorosilane (31.6 g.) and dichloro(1 - vinyl - o - carboran - 2 - yl)methylsilane (0.7192 g.) were reacted in the presence of 0.69 g. anhydrous ferric chloride and 0.68 g. of hydrated ferric chloride to provide 300 g. of rubbery product. Infrared analysis and the following analytical data revealed that a random copolymer having the formula set forth in Example 4 wherein the mole ratio of $x/y+z$ is 0.67 had been obtained.

*Analysis.*—Calcd. for $C_{36.00}H_{127.99}B_{50.06}Si_{12.99}O_{7.99}$: C, 27.10; H, 8.08; B, 33.94; Si, 22.86. Found: C, 23.64; H, 8.07; B, 33.73; Si, 19.94.

B. Preparation of adhesive composition

Following the procedure of the previous examples, an adhesive composition was made employing 100 parts by weight of the polymer described in part 1 and 50 parts of boric oxide; shear strength is set forth in the table.

COMPARATIVE EXAMPLE 1

A. Preparation of polymer 1,7-bis(methoxydimethylsilyl)-m-carborane (468,67 g., 1.4615 mole), 1,7 - bis(chlorodimethylsilyl) - m - carborane (481.7 g., 1.4615 mole), and a mixture of 1.2 g. anhydrous ferric chloride and 1.2 g. hydrated ferric chloride were mixed in a 3-liter resin kettle. The flask was placed in an oil bath and heat was applied. Gas evolution began at 178° C. and the reaction was completed in one hour, at which time the temperature was 185° C. The resulting solid polymer was ground to a fine powder and washed with an acetone/hydrochloric acid mixture, acetone, refluxing xylene, and finally acetone. The resulting material was dried under vacuum to provide 773 g. of an essentially colorless powder which was insoluble in the common organic solvents. Infrared analysis revealed that a product comprising the recurring units having the following formula had been obtained.

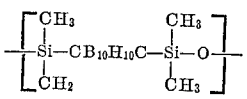

B. Preparation of adhesive composition

Following the procedure of the previous examples, adhesive compositions were made employing the polymer described in part A; the ingredients and proportions employed are set forth below and the shear strengths are recorded in the table.

| Example | Boron-oxygen-containing compound | Parts/100 parts polymer |
|---|---|---|
| C1a | Metaboric acid | 50 |
| C1b | Boric oxide | 50 |

COMPARATIVE EXAMPLE 2

A. Preparation of polymer

Following the procedure of Comparative Example 1, 1,7 - bis(methoxydimethylsilyl) - m - carborane (307.70 g., 0.9595 mole), 1,7-bis(chlorodimethylsilyl)-m-carborane (315.30 g., 0.9566 mole) and dichloro(1-vinyl-o-carboran-2-yl)methylsilane (0.8157 g., 0.0029 mole) were reacted in the presence of 0.77 g. of ferric chloride and 0.77 g. of hydrated ferric chloride to provide an insoluble, essentially colorless powder. Infrared analysis revealed that the product consisted of recurring units having the following formulas.

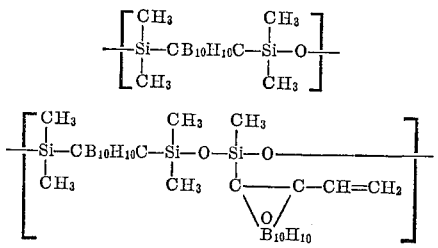

B. Preparation of adhesive composition

Following the procedure of the previous examples, adhesive compositions were made employing the polymer described in part A; the ingredients and proportions employed are set forth below and the shear strengths are recorded in the table.

| Example | Boron-oxygen-containing compound | Parts/100 parts polymer |
|---|---|---|
| C2a | Metaboric acid | 50 |
| C2b | Boric oxide | 50 |

COMPARATIVE EXAMPLE 3

A. Preparation of polymer

Following the general procedure set forth in Comparative Example 1, 1,7-bis(methoxydimethylsilyl)-m-carborane (110.6605 g.), dichlorodimethylsilane (44.3837 g.), dichloro(1-vinylcarboran-2-yl)methylsilane (0.2919 g.) and anhydrous ferric chloride (1.12 g. total) were reacted to provide a light brown, dry elastomeric product. A final oil bath temperature of 184° C. was observed. Infrared analysis confirmed that the product consisted of recurring units having the following formulas.

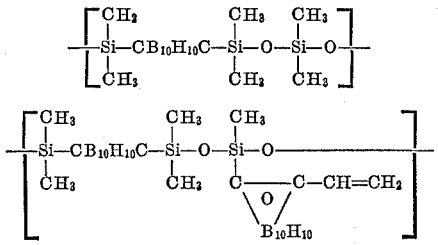

B. Preparation of adhesive composition

Following the procedure of the previous examples, adhesive compositions were made employing the polymer described in part A; the ingredients and proportions employed are set forth below and the shear strengths are recorded in the table.

| Example | Boron-oxygen-containing compound | Parts/100 parts polymer |
|---|---|---|
| C3a | Metaboric acid | 50 |
| C3b | Boric oxide | 50 |

TABLE.—SHEAR STRENGTH OF ADHESIVES

| Example: | Shear strength, p.s.i. |
|---|---|
| 1 | 1950 |
| 2 | 1630 |
| 3 | 2080 |
| 4 | 1500, 1600 |
| 5a | 1060 |
| 5b | 1810, 1975 |
| 5c | 1180 |
| 6 | 1960, 1590, 1550, 2060 |
| Comparative 1a | 720 |
| Comparative 1b | 895, 880, 920 |
| Comparative 2a | 625 |
| Comparative 2b | 895, 935 |
| Comparative 3a | 830 |
| Comparative 3b | 875, 855 |

What is claimed is:

1. A random poly-m-carboranylenesiloxane copolymer comprising units having the formulas

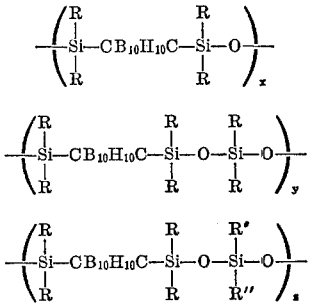

wherein each R is an independently selected lower alkyl moiety; R' is lower alkyl or phenyl; R" is vinyl or 1-vinyl-o-carboran-2-yl; $x$ and $y$ are independently selected integers greater than 1 and $z$ is 0 or an integer greater than 0 with the proviso that the mole ratio of $x/y+z$ is between about 0.1 and about 10.

2. The random poly-m-carboranylenesiloxane copolymer of claim 1 having a molecular weight greater than about 2,000.

3. The random poly-m-carboranylenesiloxane copolymer of claim 2 wherein the mole ratio of $x/y+z$ is between about 0.5 and about 8.

4. The random poly-m-carboranylenesiloxane copolymer of claim 2 wherein R is methyl.

5. The random poly-m-carboranylenesiloxane copolymer of claim 4 wherein $z$ is 0.

6. The random poly-m-carbonanylenesiloxane copolymer of claim 4 wherein $z$ is an integer greater than 0 and R' is 1-vinyl-o-carboran-2-yl.

References Cited

UNITED STATES PATENTS

| | | | |
|---|---|---|---|
| 3,388,090 | 6/1968 | Heying et al. | 260—46.5 X |
| 3,388,091 | 6/1968 | Heying et al. | 260—46.5 X |
| 3,388,092 | 6/1968 | Heying et al. | 260—46.5 X |
| 3,388,093 | 6/1968 | Heying et al. | 260—46.5 X |

TOBIAS E. LEVOW, Primary Examiner

P. F. SHAVER, Assistant Examiner

U.S. Cl. X.R.

260—29.1, 30.2, 37, 46.5